INVENTORS.
PAUL J. BELANGER and
EDGAR J. RICHARD.

INVENTORS.
PAUL J. BELANGER and
EDGAR J. RICHARD.

ic Office 3,471,609
Patented Oct. 7, 1969

3,471,609
METHOD OF ORIENTING AN APERTURED LAMINATE AGAINST THE SIDE OF A MOLD CAVITY
Paul J. Belanger, Leominster, and Edgar J. Richard, Fitchburg, Mass., assignors to Foster Grant Co., Inc., Leominster, Mass., a corporation of Delaware
Original application June 10, 1964, Ser. No. 373,968, now Patent No. 3,387,334. Divided and this application Mar. 18, 1968, Ser. No. 713,813
Int. Cl. B29d 3/00
U.S. Cl. 264—320
1 Claim

ABSTRACT OF THE DISCLOSURE

A method of drawing a laminate having an aperture therein against the side of a mold cavity by placing the laminate over a plug corresponding to the shape, but slightly larger than the aperture so as to be frictionally held by the plug, and withdrawing the plug and the laminate. In this manner, the laminate is firmly drawn against the side of the mold to allow thermoplastic material to be injected into the mold and bonded to the laminate.

---

This is a division of our pending application Ser. No. 373,968 filed June 10, 1964, now Patent No. 3,387,334. This invention relates generally to the art of manufacturing molded articles. More specifically, this invention relates to a method for making a substantially continuous groove in a molded thermoplastic object during the molding thereof, and for forming a laminate.

While my method may be adapted for use on many articles, we have found it to be most advantageous when employed in laminating sun or prescription eyeglass frames and molding substantially continuous undercut lens grooves in said eyeglass frames.

It is therefore an object of this invention to provide a novel apparatus for forming grooves in molded objects.

Another object of this invention is to provide a novel method for molding lens grooves in eyeglasses.

Still another object of this invention is to provide a method for drawing a laminate against the side of the mold cavity.

Still another object of this inventon is to provide a method for molding a laminated eyeglass frame with a lens opening contained therein.

The foregoing and other objects are achieved in injection molding methods through the use of a pivoted core member which provides a groove in the molded object. When the mold is opened, the object is partially peeled from the core and the core subsequently pivots out of the remaining portion of the molded groove.

When it is desired to form a laminate of preformed sheet stock and a molded object having corresponding openings therein, a plug is used to form at least part of the opening in the molded object. This plug is also utilized to draw the sheet stock against one side of the mold cavity. Thermoplastic material is subsequently injected into the mold cavity and bonded to the sheet stock which is firmly held in position against the side of the mold.

Other objects and features of the invention will become apparent by reference to the following specification and to the drawings.

Figure 1:
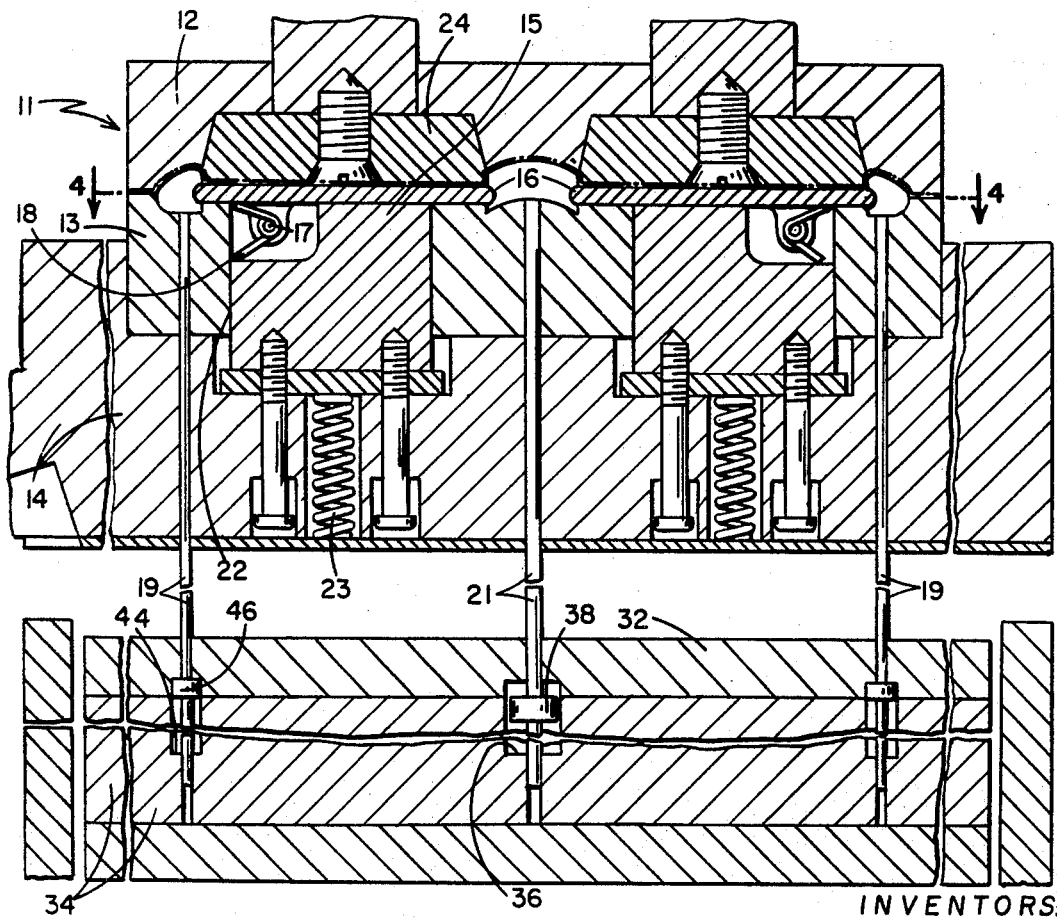
Figure 2:
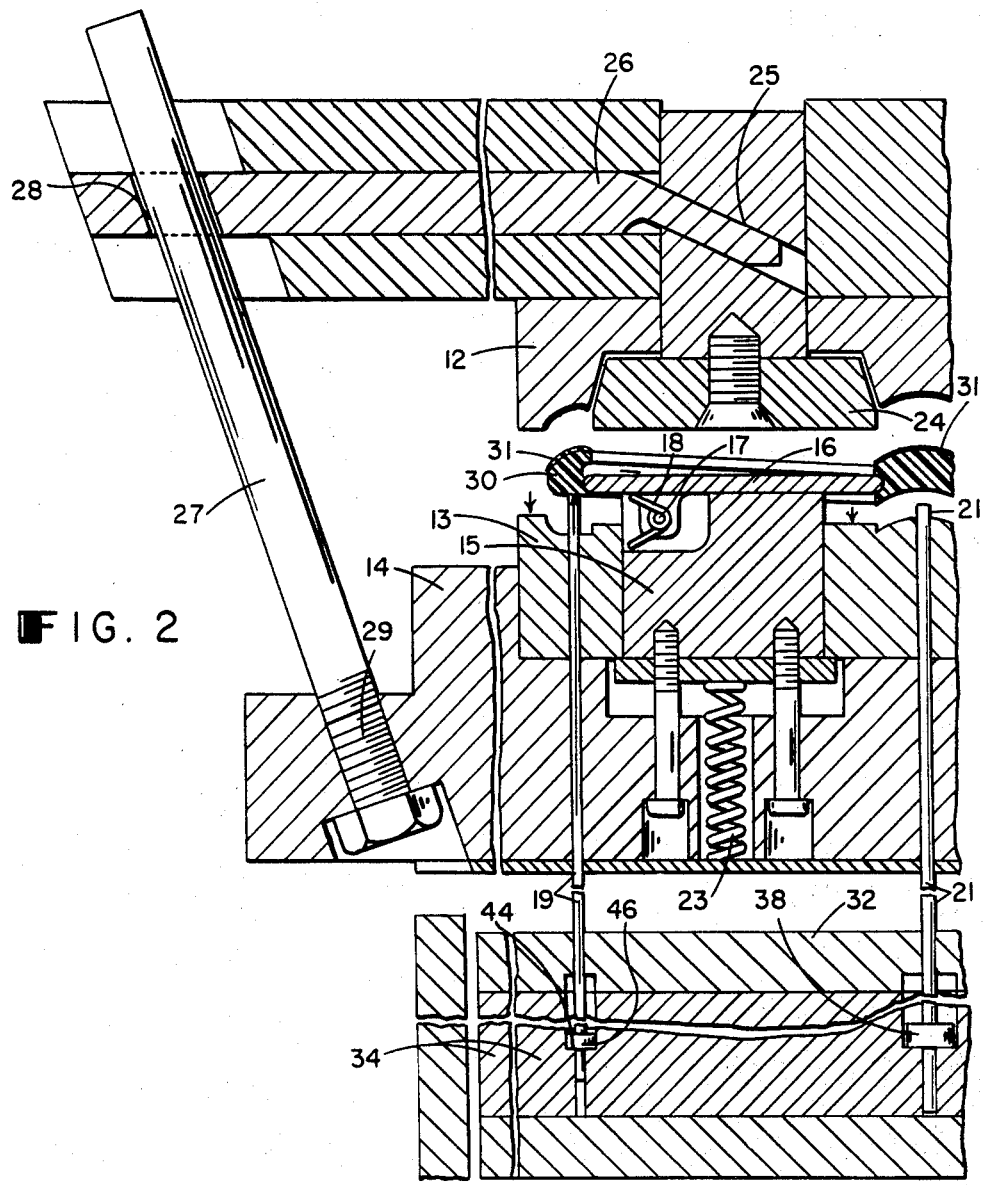
Figure 3:
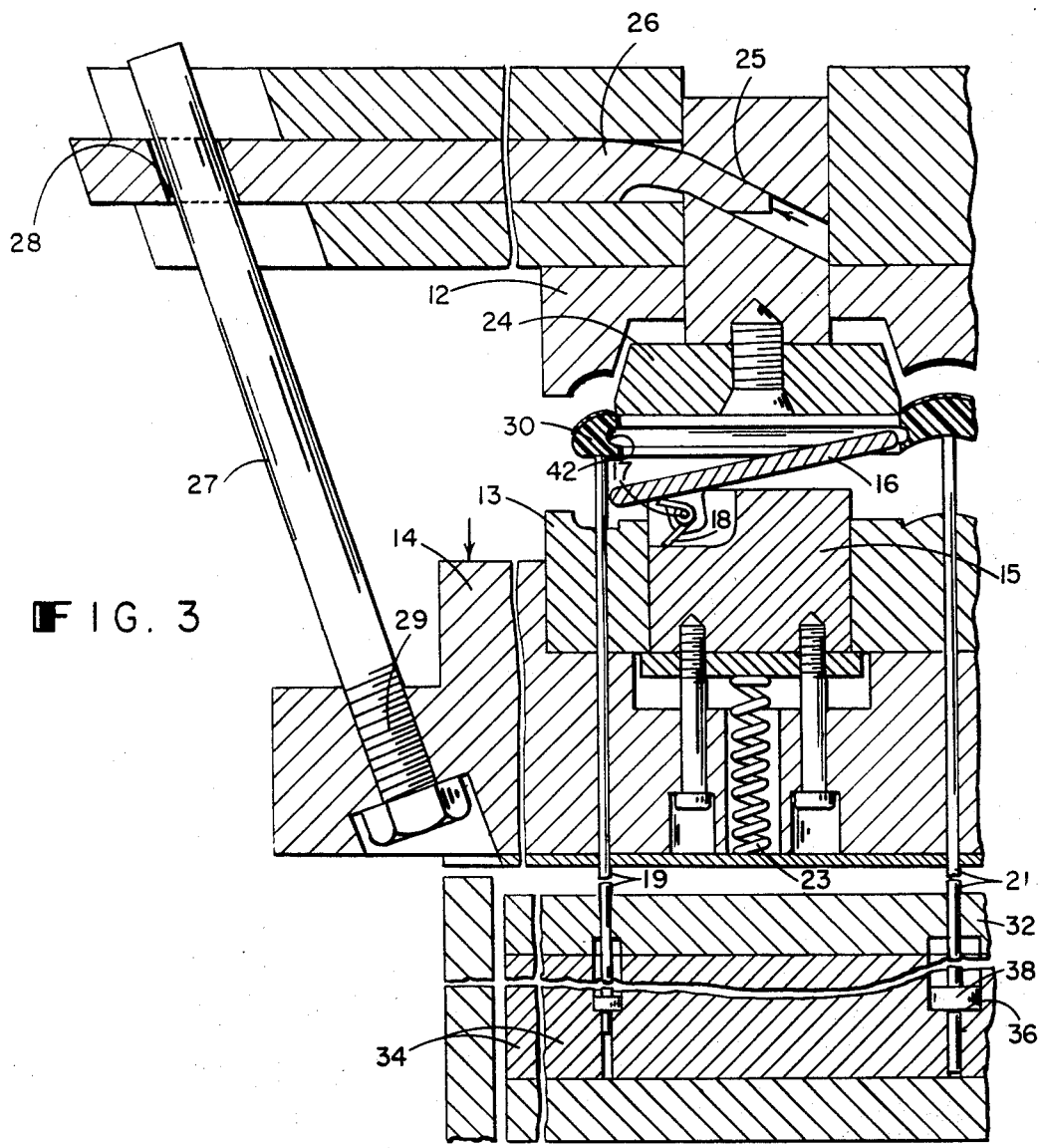

In the drawings:
FIG. 1 is a side section of a molding apparatus employing the invention.
FIG. 2 is a fragmentary section similar to FIG. 1 showing the mold cavity blocks in partially open position.
FIG. 3 is a section similar to FIG. 2 showing the mold cavity blocks in open position.

Figure 4:
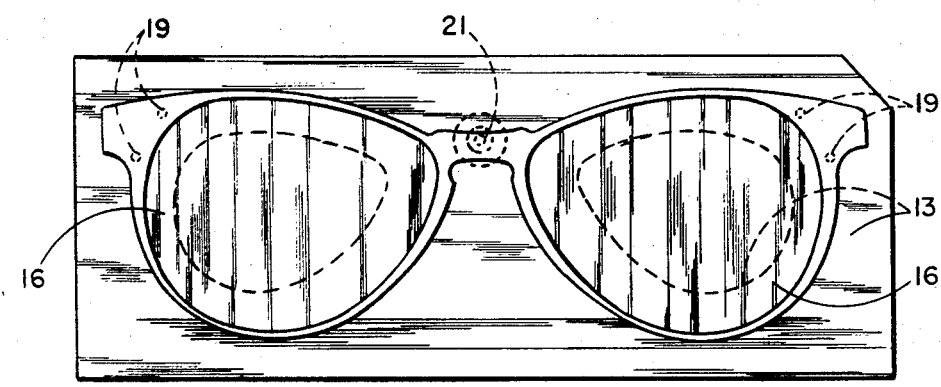
Figure 5:
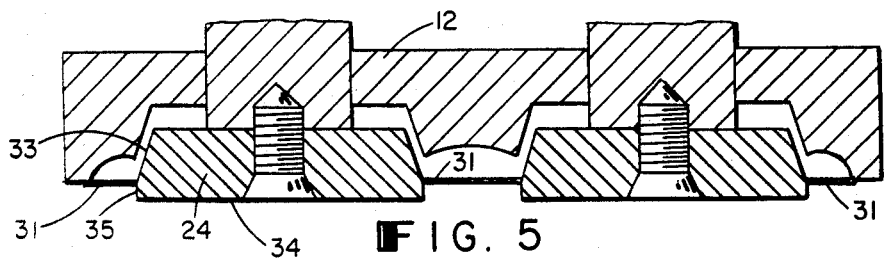
Figure 6:
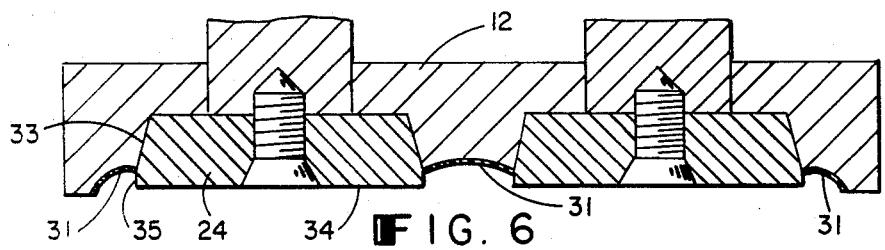

FIG. 4 is a view looking into the ejection mold cavity taken along lines 4—4 of FIG. 1, and with a molded eyeglass frame contained therein.
FIG. 5 is a fragmentary sectional view showing the mold plugs in their extended position with the laminate placed thereon.
FIG. 6 is a section similar to FIG. 5 showing the plugs in their retracted position, having drawn the laminate against the side of the mold cavity.

In the drawings, the mold 11 is shown as consisting of an injection cavity block 12 and an ejection cavity block 13. The ejection block 13 is mounted on plate 14 for movement therewith away from block 12. Block 13 is also provided with central core supports 15 adapted to support lens groove cores 16. The core members 16 are pivoted as at 17 to the members 15 to allow them to pivot as the sunglass frame 30 is stripped therefrom (see FIGS. 2 and 3). After the molded object has been stripped from cores 16, the cores are returned to their original position due to the bias of springs 18.

The block 13 is also equipped with ejector pins 19 and 21 which are actuated upon movement of block 13 to strip the molded object from the cores 16. The central support members 15 are adapted to move a short distance outwardly from the block 13 in bore 22 through the medium of compression springs 23. The ejector pins 19, 21 are actuated shortly after initial opening movement of the block 13 when shoulders 36, 44 strike bumpers 38, 46 carried by backup plate 34.

In order to provide for the placing of a preformed sheet of laminate 31 into the mold there are provided plugs 24 in block 12. Each plug is provided with slot 25 adapted to be actuated by cam member 26 to move the plug 24 from an extended to a retracted position and back. The cam member 26 is adapted to be actuated by cam rod 27 and follower groove 28. Cam rod 27 is mounted for movement with block 13 and plate 14. The cam rod 27 is affixed to plate 14 by any conventional means. By way of example it is shown as having a threaded portion 29 which is screwed into a tapped portion on plate 14.

In operation the preformed sheet 31 is placed over plugs 24, the plugs conforming in shape to the lens openings in the sheet. The sides 33 of the plugs 24 are preferably divergent in the direction of the ejection cavity block 13 to a point immediately adjacent the end 34. The end portions 35 which project into the mold cavity are substantially parallel so as to form the front side of the lens groove. When the laminate sheet stock 31 is placed over the plugs 24, it is firmly held on the plugs by reason of the friction fit between the openings in the stock 31 and the plugs 24. This is accomplished by making the lens openings in the stock material 31 slightly smaller in size than the periphery of plug ends 35. The stock 31 is stretched slightly upon placing it over plugs 24; and shrinks into a friction fit with the sides 33 of plugs 24 when it is released. (FIG. 5.) The mold is then moved from the open position substantially as shown in FIG. 5 to the closed position shown in FIG. 1 and FIG. 6. The movement of block 13 and plate 14 causes the cam rod 27 to move inwardly and cause cam member 26 to actuate cam follower slot 25 and move the plug 24 into its retracted position thereby drawing the laminate 31 against the side of the mold. The thermoplastic material is then injected into the mold where it is bonded to the laminate sheet stock 31 and allowed to cool. Subsequent to cooling of the material, the block 13 and plate 14 are withdrawn and the molded frame is supported by the core members 16. During this movement, ejector pins 19, 21 and member 15 move outwardly relative to the mold block 13 (see FIG. 2). Upon further movement of the block 13 and plate 14, the ejector pins begin to strip the ends of the molded object from the core members 16. As the block 13 and plate 14 progress rearwardly the molded object is progressively stripped from the core 16 to a point where it is stripped past the pivots 17. At this point, the moment arm having moved past pivots 17, further stripping action causes the plates 16 to pivot outwardly about pivots 17 (see FIG. 3), thus allowing the core member 16 to slide out of the groove 42. Further relative movement of the ejector pins 19, 21 will move the molded object completely free of the core 16 and allow the object to drop away from the mold cavities. When the molded frame falls free the spring 18 will urge the core plate 16 back into its original position as shown in FIG. 1.

What is claimed is:

1. A method of orienting an apertured laminate in a split mold for forming at least a portion of the surface of a molded product which comprises the steps of:

placing said laminate in position between the mold portions with an aperture therein in alignment with a mold plug corresponding to the shape of the aperture and being slightly larger than said aperture, causing relative movement between said laminate and said plug to effect penetration of said plug into said aperture by slightly stretching said laminate, stopping movement between said plug and said laminate while they are in frictional engagement, withdrawing said plug toward one of said mold portions to effect movement of said laminate in frictional engagement therewith until said laminate is pulled firmly against the side of the mold cavity of said mold portion to allow thermoplastic material to be injected into the mold cavity and bonded to said laminate.

References Cited

UNITED STATES PATENTS

| 2,562,523 | 7/1951 | Brunet | 264—294 X |
| 3,154,617 | 10/1964 | Schenk et al. | 264—266 |
| 2,797,180 | 6/1957 | Baldanza | 156—228 X |
| 3,086,651 | 4/1963 | Poupitch | 206—65 |

ROBERT F. WHITE, Primary Examiner

K. J. HOVET, Assistant Examiner

U.S. Cl. X.R

18—36; 264—267, 292, 295